United States Patent
Spahn et al.

(10) Patent No.: US 10,005,396 B2
(45) Date of Patent: Jun. 26, 2018

(54) RETRACTABLE TRUCK BED EXTENDER WITH REMOVABLE SUPPORT

(71) Applicant: FORD GLOBAL TECHNOLOGIES, LLC, Dearborn, MI (US)

(72) Inventors: Brian Robert Spahn, Plymouth, MI (US); Pattrick Loew, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days. days.

(21) Appl. No.: 15/175,858

(22) Filed: Jun. 7, 2016

(65) Prior Publication Data
US 2017/0349223 A1   Dec. 7, 2017

(51) Int. Cl.
*B60R 3/02* (2006.01)
*B62D 33/03* (2006.01)

(52) U.S. Cl.
CPC ............. *B60R 3/02* (2013.01); *B62D 33/03* (2013.01)

(58) Field of Classification Search
CPC ........ B60R 3/02; B62D 33/0273; B62D 33/03
USPC ..................................... 296/37.6, 57.1, 62
See application file for complete search history.

(56) References Cited

U.S. PATENT DOCUMENTS

| 5,028,063 | A | 7/1991 | Andrews |
| 5,205,603 | A * | 4/1993 | Burdette, Jr. ............ B60R 3/02 182/195 |
| 5,788,311 | A | 8/1998 | Tibbals |
| 6,364,392 | B1 | 4/2002 | Meinke |
| 6,454,338 | B1 | 9/2002 | Glickman et al. |
| 6,626,478 | B1 | 9/2003 | Minton |
| 6,764,123 | B1 | 7/2004 | Bilyard |
| 6,918,624 | B2 | 7/2005 | Miller et al. |
| 6,935,671 | B2 | 8/2005 | Bruford et al. |
| 6,988,756 | B1 | 1/2006 | Meinke et al. |
| 7,090,276 | B1 * | 8/2006 | Bruford ............ B62D 33/0273 296/1.02 |
| 7,234,749 | B1 | 6/2007 | Firzlaff et al. |
| 7,267,387 | B1 | 9/2007 | Bruford et al. |
| 7,469,915 | B2 | 12/2008 | Horn et al. |
| 7,472,938 | B2 | 1/2009 | Firzlaff et al. |
| 7,488,021 | B1 | 2/2009 | Roos et al. |
| 7,712,811 | B2 | 5/2010 | Heaman et al. |

(Continued)

OTHER PUBLICATIONS

Non-final Office Action dated Nov. 7, 2017 for Utility U.S. Appl. No. 15/185,633, filed Jun. 17, 2016.

*Primary Examiner* — Jason S Daniels
(74) *Attorney, Agent, or Firm* — Jason Rogers; King & Schickli, PLLC (57) ABSTRACT

An apparatus for extending a vehicle bed includes a tailgate having first and second retractable members adapted for being recessed within the tailgate and for projecting therefrom in an extended position when the tailgate is lowered. A removable support is provided for connecting with the first and second retractable members in the extended position for extending the vehicle bed. The removable support may comprise a ladder supported by the tailgate. The ladder may assume a lowered position for use in stepping onto the tailgate using the retractable members as handles and a raised position substantially aligned with the retractable members for extending the vehicle bed. The removable support may also comprise a cross bar that connects with the retractable members to form the bed extension.

14 Claims, 7 Drawing Sheets

(56) References Cited

U.S. PATENT DOCUMENTS

| | | |
|---|---|---|
| 8,146,786 B2 | 4/2012 | Cheung et al. |
| 8,201,869 B1 | 6/2012 | Butlin, Jr. et al. |
| 9,302,719 B1 | 4/2016 | Krishnan et al. |
| 9,452,782 B1 | 9/2016 | Singer |
| 9,517,711 B2 | 12/2016 | Krajenke et al. |
| 2005/0093325 A1* | 5/2005 | Bruford .................. B60P 3/40 296/57.1 |
| 2008/0136208 A1 | 6/2008 | Kuznarik et al. |

* cited by examiner

RETRACTABLE TRUCK BED EXTENDER WITH REMOVABLE SUPPORT

TECHNICAL FIELD

This document relates generally to the motor vehicle field and, more particularly, to a retractable extender including a removable support for extending the bed of a truck.

BACKGROUND

For various reasons, it may be desirable to extend the effective length of a truck bed, such as for hauling a particularly long piece of cargo that would not fit in the bed with the tailgate in the raised position. In some cases, this is done by lowering the tailgate and placing a separate cage-like structure comprised of stacked, curved bars on it to help contain the cargo within the resulting extension created by the lowered tailgate. While effective, this arrangement requires using a large, separate component for placement on the lowered tailgate, which must be stored apart from the truck when not in use.

Thus, a need is identified for a bed extender that can be easily stowed when not in use, and capable of being readily deployed for extending the effective length of the bed.

SUMMARY

In accordance with the purposes and benefits described herein, an apparatus for extending a vehicle bed is provided. The apparatus comprises a tailgate adapted for being raised and lowered relative to the vehicle bed. The tailgate includes one or more retractable members adapted for being recessed within the tailgate and for projecting therefrom in an extended or deployed position when the tailgate is lowered. A removable support in the form of a ladder may be provided for connecting with the first and second retractable members in the extended position for extending the vehicle bed.

In one embodiment, the ladder is adapted to move from a lowered position for use in stepping onto the tailgate using the retractable members as handles to a raised position substantially aligned with first and second retractable members for extending the vehicle bed. The ladder may further include a transverse portion wider than a space between the first and second retractable members, such that the transverse portion of the ladder rests on the retractable members in the extended position. A connector may also be provided for connecting with one of the first or second retractable members, and the transverse portion of the ladder may include a cutout for receiving one of the first or second retractable members.

The ladder may also include first and second telescoping supports connected to the tailgate. Each support may include an extendable portion adapted for pivoting relative to the tailgate. This pivoting allows the step to move between the lowered position for use in stepping and the raised position for extending the vehicle bed.

The first and second retractable members may comprise telescoping supports at least partially recessed within a cavity of the tailgate. In one embodiment, the first and second retractable members are adapted for pivoting from a raised position in alignment with the tailgate to a lowered position. The removable support may comprise a transverse portion connecting the retractable members, such as a cross bar removably connected to the first and second retractable members.

According to a further aspect of the disclosure, an apparatus for extending a vehicle bed including a tailgate is provided. The apparatus comprises first and second retractable members for moving from a retracted position within the tailgate to an extended position projecting from the tailgate. A transverse connector for connecting the first and second retractable members. The transverse connector includes at least one receiver for receiving a portion of the retractable member.

In one embodiment, the transverse connector includes a first receiver for receiving the first retractable member and a second receiver for receiving the second retractable member. Third and fourth retractable members may be connected to the transverse connector. The third and fourth retractable members may be mounted for pivoting relative to the tailgate to achieve the lowered position of the retractable ladder. The transverse connector may comprise a step in the lowered position of the third and fourth retractable members.

In accordance with another aspect of the disclosure, an apparatus for extending a vehicle bed including a tailgate is provided. The apparatus comprises first and second retractable members for projecting from the tailgate in an extended position and for being recessed within the tailgate in a retracted position, the first and second retractable members including aligned openings. A cross bar is provided for positioning in the aligned openings of the first and second retractable members.

In one embodiment, the cross bar comprises first and second interconnected portions, each having an oversized head for capturing the cross bar in position relative to the first and second retractable members. The first and second portions of the cross bar may be connected by threaded engagement.

In the following description, there are shown and described several preferred embodiments of the truck bed extender. As it should be realized, the arrangement is capable of other, different embodiments and its several details are capable of modification in various, obvious aspects all without departing from the truck bed extender as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the truck bed extender and together with the description serve to explain certain principles thereof. In the drawing figures.

Reference will now be made in detail to the present preferred embodiments of the truck bed extender, examples of which are illustrated in the accompanying drawing figures.

DETAILED DESCRIPTION

Figure 1:
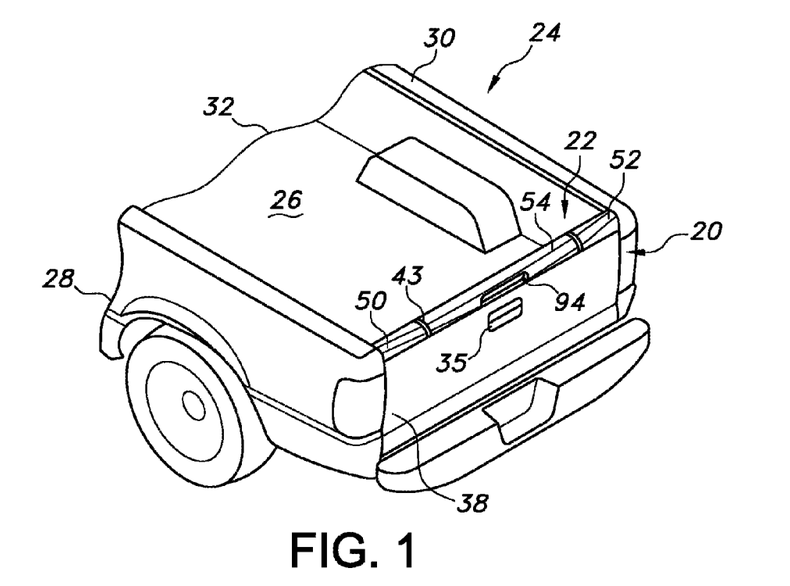
FIG. 1 is a partially cutaway, rear perspective view of a vehicle bed including a tailgate with a ladder in a retracted position.

Reference is now made to FIG. 1, which illustrates a tailgate 20 including a retractable ladder 22. The tailgate 20 is adapted to mount to a vehicle 24, such as a pickup truck. The vehicle 24 includes a storage compartment or bed 26 that is defined by a left rear quarter panel 28, which forms a first vertical surface of the bed 26; a right rear quarter panel 30, which forms a second vertical surface of the bed 26; a floor 32, which extends between the two panels 28, 30; and the tailgate 20.

Figure 3:
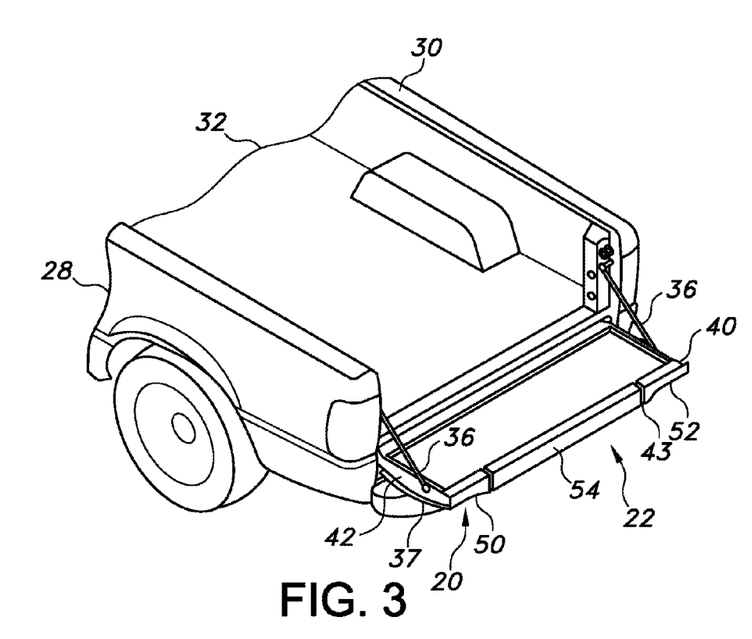
FIG. 3 is a similar view with the tailgate in the lowered position, ready for loading the bed with cargo.
Figure 9:
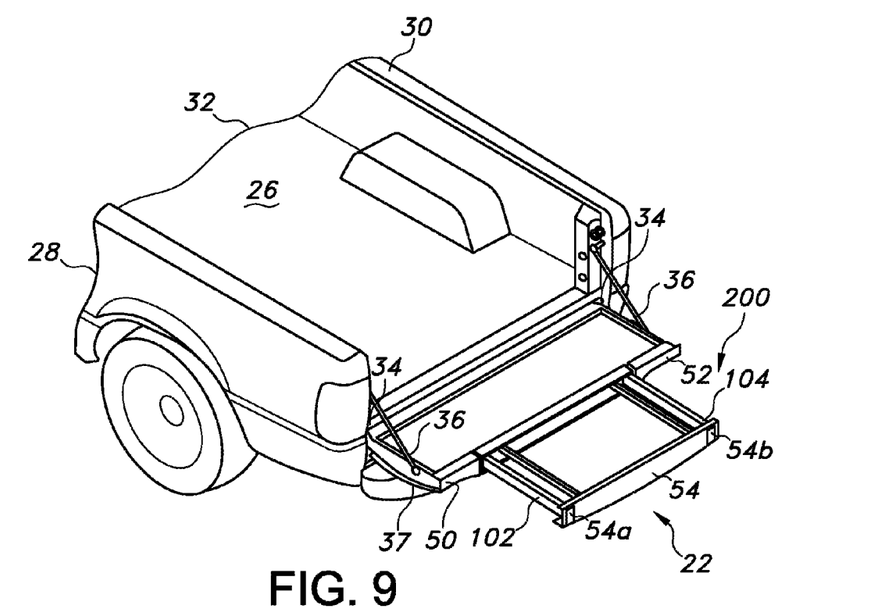
FIG. 9 is a partially cutaway perspective view of the vehicle bed taken from the rear, illustrating a retractable bed extender formed from the combination of the handles and the ladder when connected in a common horizontal plane.

As can be understood by comparing FIGS. 1 and 3, the tailgate 20 may pivot between a generally vertical closed position and a generally horizontal open position to expose and cover an open end of the bed 26. In this regard, and as perhaps best shown in FIG. 9, the tailgate 20 includes a pair of tailgate hinges 34 for cooperating with the side panels 28, 30. A pair of tailgate supports 36 connected to these panels 28, 30 support the tailgate 20 in the lowered or horizontal position. A tailgate handle 35 mounts to an outer panel 38, and functions in a conventional manner. The release mechanism for the tailgate 20, as well as tailgate latches, are conventional and well known in the art and so are not shown in detail.

The tailgate 20 includes a tailgate frame 37, which forms the outer finished surface of the tailgate 20, and an inner panel 40, which mounts to the outer panel 38 and forms the inner surface and sides 42 of the tailgate 20. The outer panel 38 and inner panel 40 combine to form a channel 68. Other tailgate reinforcement members (not shown) and brackets (not shown) may be mounted within the frame 37 to provide structural support to the frame outer and inner panels 38, 40.

A left tailgate molding 50 and a right tailgate molding 52 may form the upper surfaces of the tailgate 20. These moldings 50, 52 help to prevent paint scratches on metal parts when cargo is being loaded over the top of a closed tailgate 20. The moldings 50, 52 may be made of colored plastic that is the desired color of the parts, which eliminates the need to paint them.

Figure 2:
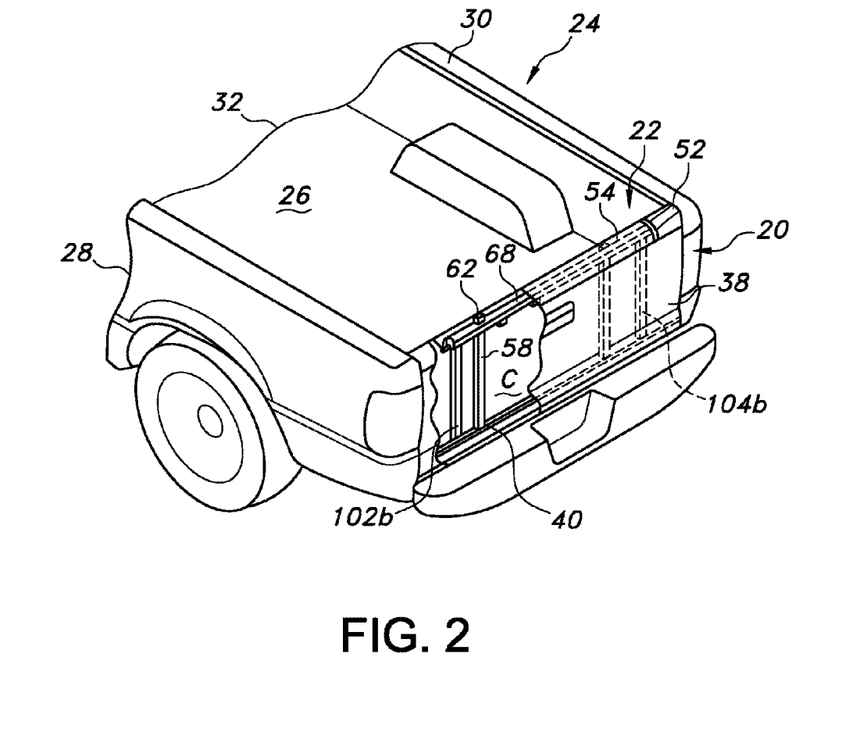
FIG. 2 is a similar view, with a cutaway illustrating an interior portion of the tailgate to show certain of the structures forming the ladder.

The components that make up the tailgate frame 37 are formed so that a hollow internal cavity C is created, as indicated by the partially cutaway view provided in FIG. 2. Within this cavity C, the ladder 22 is retained in the retracted configuration. In one embodiment, the ladder 22 includes a transverse portion 54 (which together with moldings 50, 52 form the upper end surface of the tailgate 20), a movable frame portion 56, and guide rails 58. As can be understood with reference to FIGS. 5 and 6, the guide rails 58 are hollow, generally rectangular tubes fixed to the tailgate frame 37 and support the movable frame portion 56 as it is telescopically extended from and retracted into the guide rails 58.

Figure 5:
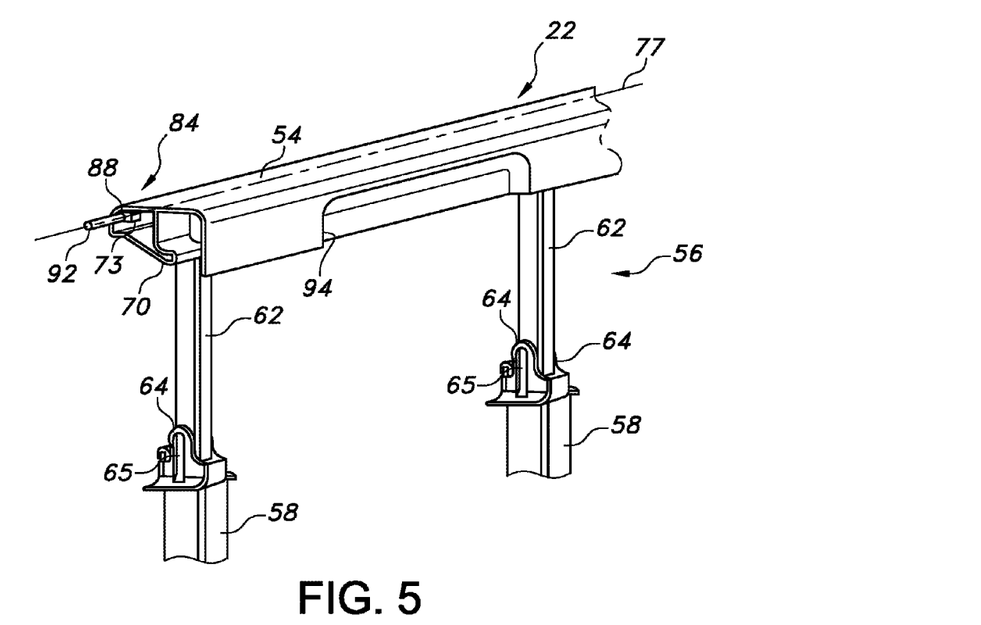
FIG. 5 is a partially cutaway view of a retractable ladder according to one possible embodiment.
Figure 6:
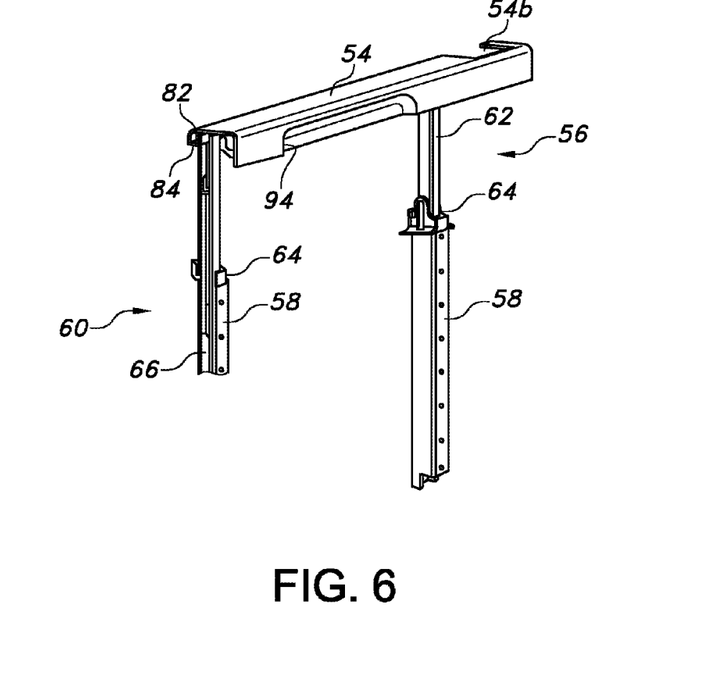
FIG. 6 is a partially cutaway view illustrating the extension and retraction mechanism associated with the ladder.

Each guide rail 58 includes pivot brackets 64 that cooperate with the movable frame portion 56 to allow for both pivoting of the movable frame portion relative to the tailgate 20 and also prevent the movable frame portion from being separated from the guide rails 58. The bottoms of the guide rails 58 may be fastened to the inner panel 40 in order to help secure the guide rails to the tailgate 20.

With continued reference to FIGS. 5 and 6, the movable frame portion 56 includes a pair of supports 62 that may retracted into and extend from the respective guide rail 58. Each support 62 is received telescopically in a respective one of the guide rails 58. As can be further understood from FIG. 8, each of the guide rails 58 may include a block spacer 55 mounted therein against which the supports 62 can slide. The block spacers 55 may be formed of plastic to minimize potential scratching of the supports 62 as they slide relative to the guide rails 58. Each of the supports 62 includes a hinge pin 66 that cooperates with the pivot brackets 64, when fully extended. This allows for pivoting of the movable frame portion 56 relative to the guide rails 58, while still allowing the guide rails to retain and support the supports 62. The hinge pins 66 may be secured to the supports 62 by welding, interference fit, or some other suitable means.

Each of the supports 62 may also connect to a corresponding latching assembly 60. The latching assemblies 60 releasably fix the supports 62 to a certain limited number of telescopically extended positions relative to the guide rails 58. When extended out partially, the guide rails 58 hold the supports 62 parallel, thus creating a longer effective bed for the vehicle 24 when the tailgate 20 is in the horizontal position.

Each of the movable frame portion's supports 62 are hollow for receiving a respective one of the two latching assemblies 60 therein. More specifically, and with further reference to FIG. 8, the latch housings 78 extend through each of the supports 62 and connect, at their upper ends, to the lower ends of latch actuation rods 80 via retainer barrels 81. The upper ends of the latch actuation rods 80 are secured, via retaining clips 83, to release levers 82, which are part of the transverse portion 54, in order to form a releasable connector 84.

The pivot mounts 73 on the support frame 70 connect to and mount the transverse portion 54 about a pivot axis 77. More specifically, the transverse portion 54 may be formed from plastic, or other suitable material, such as, for example, a thirty percent glass filled polypropylene. The release levers 82 may be molded into the transverse portion 54 while it is being formed or affixed thereto after forming by, for example, friction welding. Each release lever 82 includes a base 86 that is adjacent to the transverse portion 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the transverse portion 54 to pivot about the pivot axis 77. Each release flange 90 is offset from the pivot axis 77 and is connected to one of the latch actuation rods 80. Thus, when the transverse portion 54 is pivoted, the release flanges 90 pull up on the latch actuation rods 80. The latching assemblies 60 unlatch, allowing the supports 62 to slide relative to the guide rails 58, when the latch actuation rods 80 are pulled upwards, and re-engage when the latch actuation rods 80 are released.

The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the supports 62 relative to the guide rails.

Figure 8:
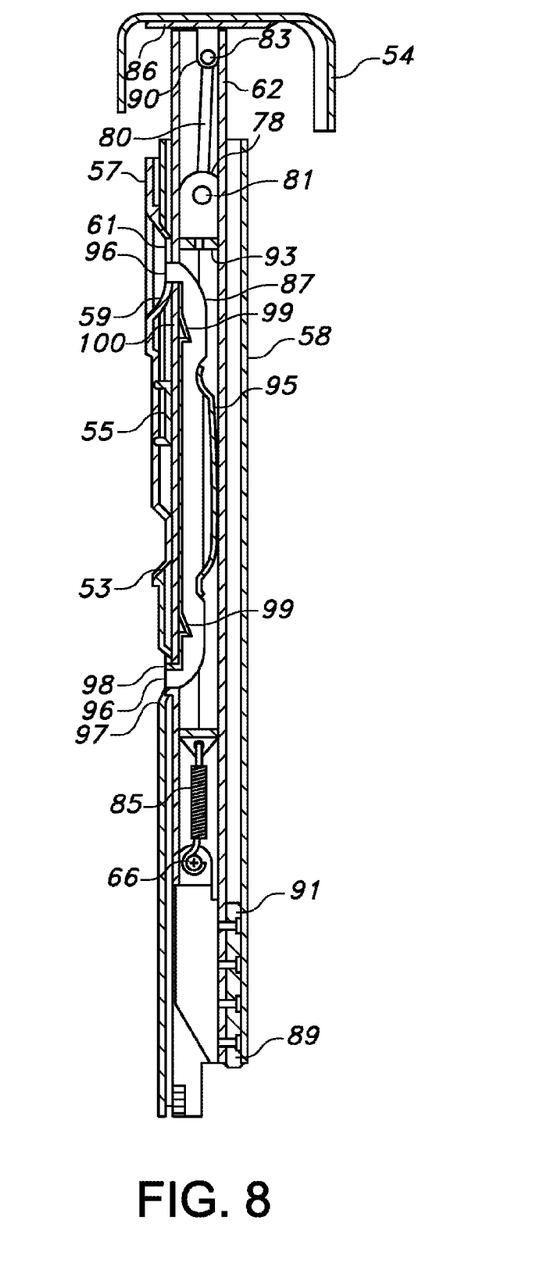
FIG. 8 is a cross-sectional side view of the support arrangement for the ladder according to one embodiment.

With reference to FIGS. 5 and 8, each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the supports 62. When aligned, the retention tabs 96 are biased by the springs 95 to extend through engagement slots 98 in the guide rails 58 and through engagement slots 61 in insert plates 59. The insert plates 59 may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the supports 62 relative to the guide rails 58. This small adjustability may allow one to make sure that the top of the transverse portion 54 is flush with the tops of the tailgate moldings 50, 52 when the ladder 22 is in its stowed position. Each latch housing 78 also includes internal flanges 99, located within the slot 93, that engage release ramps 100 on the latch blade 87.

To deploy the ladder 22 from its stowed position, the transverse portion 54 may be grasped and pivoted relative to the pivot axis 77. This causes the release flanges 90 to pull on the latch actuation rods 80, which, in turn, pull on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released.

Further retraction of the transverse portion 54 telescopically slides the supports 62 relative to the guide rails 58, while allowing the transverse portion to pivot back into its latch engaged position. Once the movable frame portion 56 slides out to a predetermined extended position relative to the tailgate 20, the retention tabs 96 on the lower end of the latch blades 87 engage a slot 53 or slot 61 (depending upon how far the supports 62 are slid prior to releasing the transverse portion 54), thus fixing the movable frame portion 56 relative to the guide rails 58. Also, at these extended positions, the supports 62 still remain partially within the guide rails 58 so that the two will not pivot relative to one another. With the tailgate 20 in its horizontal open position, the ladder 22 is now in its bed extender position. While only a limited number of bed extender positions are discussed herein, the ladder 22 may have multiple bed extender positions by providing additional engagement slots, if so desired.

The transverse portion 54 may then be pivoted again to release the latching assemblies 60 once more. One may then pull the ladder 22 out to its fully extended position relative to the open tailgate 20. In this fully extended position, the supports 62 will be pulled out of the guide rails 58, with the hinge pins 66 engaged in the slots 65 of the pivot brackets 64.

Figure 4:
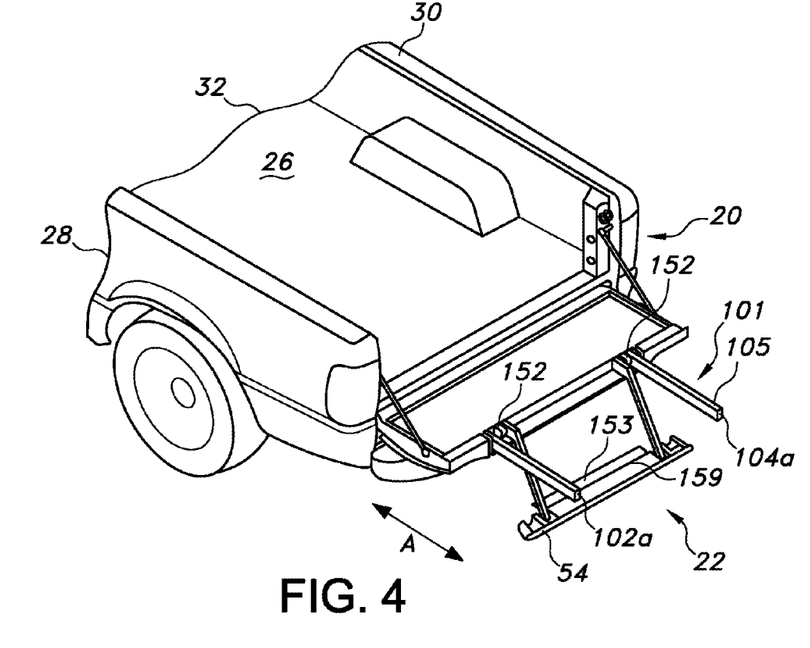
FIG. 4 is a similar view showing a railing formed by extendable rails and a retractable ladder in a lowered position, ready for use in stepping into the bed from the ground.

The movable frame portion 56, from its fully extended position, can be pivoted downward until the supports 62 engage stops 152. The size and location of the stops 152 determines the downward angle at which the supports 62 engage the structural stops 152. This angle can be any angle that is deemed most convenient for positioning of an assist step. After the frame portion 56 is in this downward extending, generally vertical orientation, one then uses a hand or foot to pivot a flip step 153 connected to the transverse portion 54 by a hinge 159 from its closed position resting against the support frame 70 to its open position generally flush and coplanar with the support frame 70 and extending toward the vehicle 24. The ladder 22 is now in its step assist position (as best seen in FIG. 4). The flip step 153 and the support frame 70 act together to form a step that is wide enough to be comfortable for a foot when one is standing thereon. If so desired, one may also provide traction grooves 151 or apply a tape or a similar traction device to the upper surfaces of the support frame 70, flip step 153 or both in order to improve the traction of a person standing on the step.

Figure 7:
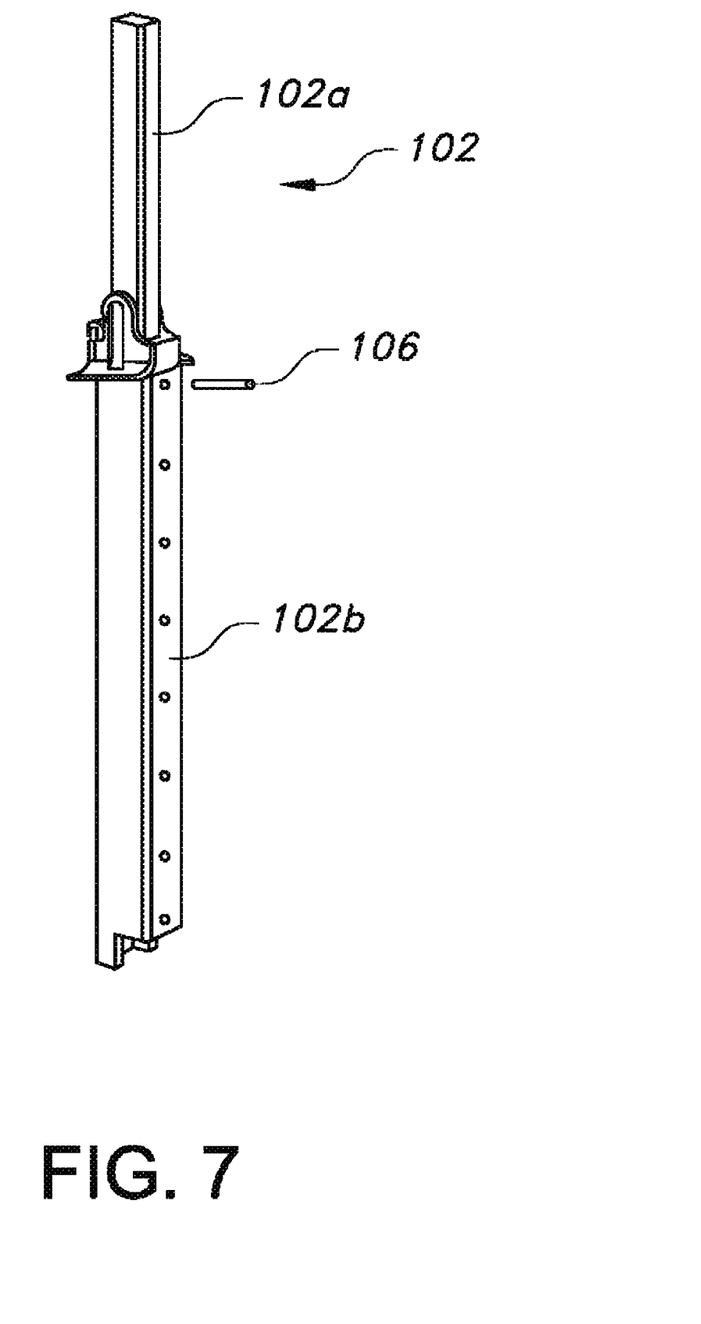
FIG. 7 is a partially cutaway view showing the extension and retraction mechanism associated with each handle forming the railing.

With combined reference to FIG. 4, it can also be understood that the tailgate 20 may include an extendable railing 101 to provide support for a person when using the ladder 22 in the deployed or lowered position. In one embodiment, this railing 101 includes one or more spaced, elongated handles, which in the illustrated embodiment take the form of first and second retractable members 102, 104, one positioned on each side of the ladder 22. These members 102, 104 are adapted for being withdrawn from the tailgate 20 in the active condition, and for returning to a retracted position within it in an inactive condition. As shown in FIG. 7, each member 102 (only one shown) may include an extendable portion 102a that telescopes into another member, such as a tubular receiver 102b, associated with and fixed to the tailgate 20. A suitable locking pin 106 may also be provided for locking the extendable member 102, 104 in the extended and retracted positions.

According to one aspect of the disclosure, the ladder 22 and one or both of the members 102, 104 (if two are present) may be combined to form a retractable bed extender 200 for use in combination with the existing vehicle bed 26. Specifically, with reference to FIG. 9, the extendable portions 102a, 104a of the retractable members 102, 104 forming railing 101 in the extended position may engage the transverse portion 54 of the ladder 22 when in an extended, generally horizontal position. As can be appreciated from FIG. 10, this transverse portion 54 of the ladder 22 may have a corresponding dimension, or width, equal to or greater than the spacing S between the members 102, 104, such that the transverse portion may engage and be supported by the extended portions 102a, 104a when in a similar, substantially horizontal orientation.

Figure 10:
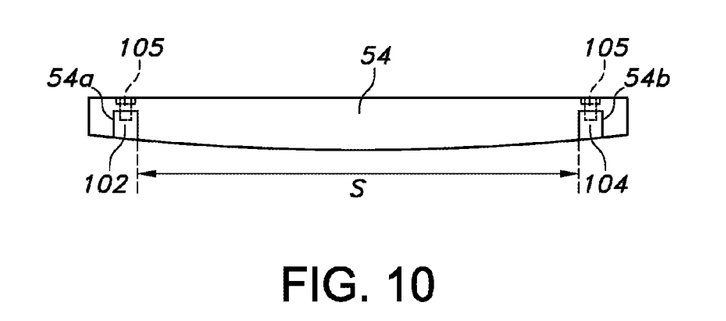
FIG. 10 is an end view of the retractable bed of FIG. 9.

The ladder 22 may be adapted for releasably engaging the portions 102a, 104a of the members 102, 104 in the extended position. Specifically, as shown in FIG. 10, the transverse portion 54 may include one or more receivers, such as openings or cutouts 54a, 54b for receiving the corresponding end portions of the members 102, 104 (such as when pivoted vertically a few degrees). The transverse portion 54 may also include connectors, such as fixed or removable pins 105, for positioning in one or more openings in the extended portions 102a, 104a members 102, 104 to form a secure, but releasable engagement when the bed extender 200 is extended. As should be appreciated, the arrangement may be reversed with the same result, with the connectors or pins 105 provided on the members 102, 104 and passing into the transverse portion 54.

Figure 11:
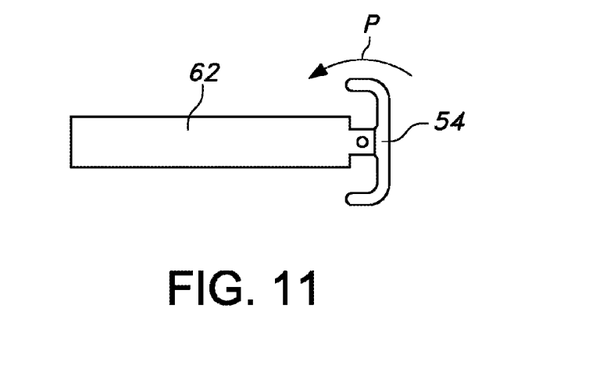
FIG. 11 is a cutaway side view of the ladder, illustrating the pivoting capabilities of a transverse portion for forming the retractable bed extender.

It can be further appreciated that, as a result of this arrangement, the entire retractable bed extender 200 may be extended and retracted without disconnecting the transverse portion 54 for use as a step (see action arrow A in FIG. 4). When deployment of the ladder 22 is desired, the transverse portion 54 may simply be disconnected from members 102, 104, such as by raising it slightly, including by way of pivoting (see arrow P in FIG. 11), and the members then adjusted if necessary to allow the transverse portion to move downwardly to the lowered position shown in FIG. 4. The portions 102a, 104a of members 102, 104 may then be extended and pinned in place to complete the transformation to a configuration that facilitates stepping into the bed 26 using the transverse portion 54, including as modified using the flip step 153.

Figure 12:
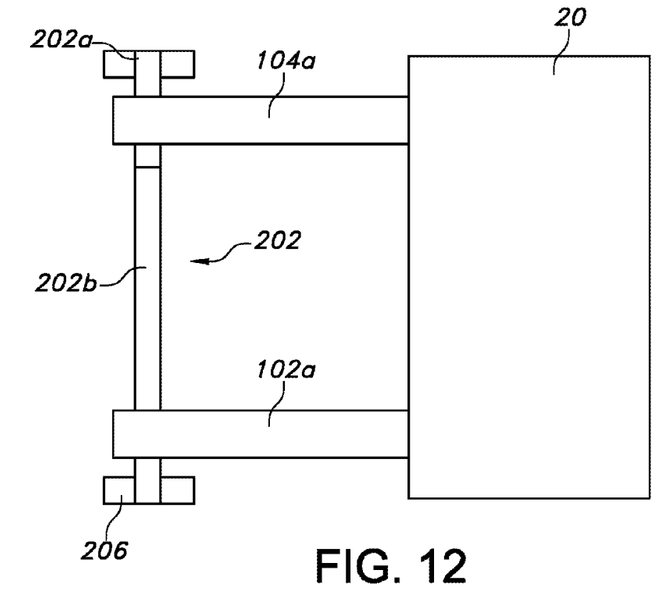
FIGS. 12 and 13 schematically illustrate an alternate embodiment of the retractable bed extender.
Figure 13:
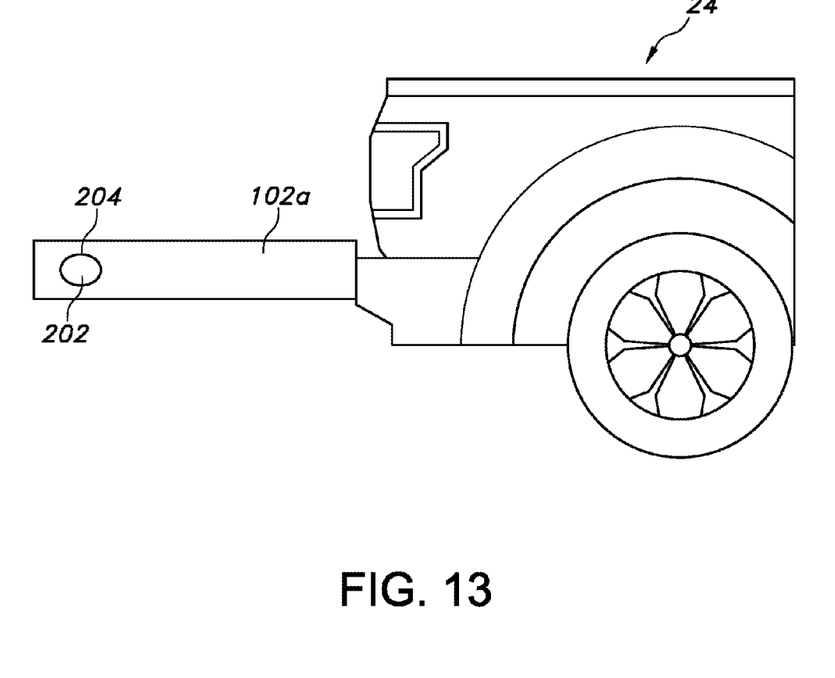

Referring to FIGS. 12 and 13, it is also possible to form the retractable bed extension 200 without using the ladder 22. Specifically, in a situation where ladder 22 is absent, the members 102, 104 may be extended and a separate, removable support may be associated with the members in the extended position. This removable support may take the form of a cross bar 202, which may pass through aligned apertures 204 formed in the members 102, 104. The cross bar 202 may comprise first and second portions 202a, 202b, which may be removably connected together, such as by threaded engagement, and which may each further include an oversized head 206.

Once positioned spanning the extended portions 102a, 104a of the members 102, 104, the cross bar 202 may then be fixed in place. When not in use, the cross bar 202 may be disassembled and stowed within a corresponding cavity formed in the tailgate 20, such as the one that would normally receive parts of the ladder 22. The extendable members 102, 104 may also be mounted for pivoting movement when the portions 102a, 104a are extended, as noted above, such that the cross bar 202 could be used as a step when in a pivoted or lowered position. The cross bar 202 may also be used in connection with the extendable members 102, 104 when a ladder 22, if present, is in the retracted position.

As with moldings 50, 52, the transverse portion 54 of ladder 22 may be molded with the plastic being the desired final color so that it does not have to be painted. This transverse portion 54 may also include a pocketed handle 94 that provides for ease of gripping and pivoting the transverse portion 54 when deploying the ladder 22. The transverse portion 54 also may have an overall width that is just smaller than a gap 43 formed between the two tailgate moldings 50, 52, and a top surface flush with the corresponding surfaces of the tailgate moldings 50, 52.

Additionally, if so desired, the two tailgate moldings 50, 52 may include recessed flanges (not shown) that nest under the edges of the transverse portion 54. Accordingly, the transverse portion 54 of the ladder 22, when in its fully retracted position, blends in with the tailgate 20. Thus, the ladder 22 may be included without detracting from the esthetically pleasing look of the vehicle 24, and still allows the sliding of cargo into and out of the bed 26 over the top of a closed tailgate 20 without creating paint scratch concerns.

In summary, numerous benefits are provided by providing a retractable bed extender 200 for a vehicle 24 including a tailgate 20, such as a pick-up truck. The extender 200 may be formed from an existing ladder 22 in a generally horizontal combination with retractable members 102, 104, which may alternately serve as a railing 101 for aiding in using the ladder to enter the bed 26. A more secure and stable arrangement results, and one that does not require storage apart from the tailgate. A removable member, such as a cross bar 202, may also be used to form the retractable bed extender 200, with similar effect.

While one embodiment of a ladder 22 is described above, a further description of similar arrangements may be found in U.S. Pat. Nos. 6,918,624, 7,090,276, and 7,234,749, the disclosures of which are incorporated herein by reference. The disclosures of U.S. Pat. Nos. 7,488,021, 7,267,387, and 9,302,719 are also incorporated herein by reference.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. An apparatus for extending a vehicle bed, comprising:
a tailgate adapted for being raised and lowered relative to the vehicle bed, the tailgate including a retractable member recessed within the tailgate in a retracted position and projecting therefrom in an extended position when the tailgate is lowered; and
a retractable ladder supported in a raised position and prevented from being lowered by the retractable member in the extended position for extending the vehicle bed.

2. The apparatus of claim 1, wherein the tailgate comprises first and second retractable members recessed within the tailgate in a retracted position and projecting therefrom in an extended position for supporting the retractable ladder.

3. The apparatus of claim 2, wherein the first and second retractable members each comprise a telescoping portion extendable from a support at least partially recessed within the tailgate.

4. The apparatus of claim 2, wherein the retractable ladder is supported by the tailgate for moving to either a lowered position for use in stepping onto the tailgate with the first and second retractable members disconnected from the ladder or the raised position substantially aligned with the first and second retractable members for supporting the retractable ladder against moving to the lowered position when fully extended.

5. The apparatus of claim 4, wherein the retractable ladder comprises first and second telescoping supports connected to the tailgate, each telescoping support including an extendable portion adapted for pivoting relative to the tailgate to allow the retractable ladder to move between the lowered position for use in stepping and the raised position for extending the vehicle bed.

6. The apparatus of claim 4, wherein the retractable ladder includes a transverse portion wider than a space between the first and second retractable members in the extended position.

7. The apparatus of claim 6, wherein the transverse portion of the retractable ladder rests upon one of the first or second retractable members in the raised position.

8. The apparatus of claim 6, wherein the transverse portion of the retractable ladder includes a cutout for receiving one of the first or second retractable members.

9. A vehicle including the apparatus of claim 1.

10. The apparatus of claim 1, further including a locking pin for locking the retractable member in the extended position for supporting the retractable ladder against lowering.

11. An apparatus for extending a vehicle bed including a tailgate, comprising:
   first and second retractable members for moving from a retracted position within the tailgate to an extended position projecting from the tailgate for extending the vehicle bed; and
   a transverse connector removably engaging and supported by the first and second retractable members, the transverse connector including at least one receiver for receiving at least one of the first and second retractable members in the extended position.

12. The apparatus of claim 11, wherein the transverse connector includes a first receiver for receiving the first retractable member and a second receiver for receiving the second retractable member.

13. The apparatus of claim 12, further including third and fourth retractable members connected to the transverse connector, the third and fourth retractable members being mounted for pivoting relative to the tailgate to achieve a lowered position relative to the tailgate.

14. A vehicle including the apparatus of claim 11.

\* \* \* \* \*